United States Patent [19]

Hedbom

[11] 4,200,147
[45] Apr. 29, 1980

[54] DEVICE FOR THE EXCHANGE OF HEAT BETWEEN SUPPLY AIR AND EXHAUST AIR IN INDOOR PREMISES

[75] Inventor: Hans S. Hedbom, Sollentuna, Sweden

[73] Assignee: Aktiebolaget Carl Munters, Sollentura, Sweden

[21] Appl. No.: 859,034

[22] Filed: Dec. 9, 1977

[30] Foreign Application Priority Data

Dec. 17, 1976 [SE] Sweden ............................... 7614240

[51] Int. Cl.² ............................................. F28D 21/00
[52] U.S. Cl. ............................ 165/104 S; 165/107 R; 165/DIG. 12; 165/DIG. 24; 237/66
[58] Field of Search ........... 165/107, DIG. 12, 104 S, 165/DIG. 24; 237/65, 66

[56] References Cited

U.S. PATENT DOCUMENTS 4,119,142 10/1978 Margen ............................. 165/107 R

FOREIGN PATENT DOCUMENTS 541071 1/1977 U.S.S.R. ..................................... 237/66

Primary Examiner—Albert W. Davis, Jr.
Attorney, Agent, or Firm—Eric Y. Munson

[57] ABSTRACT

A heat exchange system in which sensible and/or latent heat is exchanged between a stream of incoming air into an enclosure and a stream of air leaving the enclosure, comprising a heat exchanger for the incoming air and a heat exchanger for the leaving air, each of said exchangers comprising a group of passages through which the incoming air stream and the leaving air stream, respectively, flow in heat exchange relationship with a liquid passing through a separate group of passages. The liquid is circulated in a closed circuit between the two exchangers in a duct leading from the heat exchanger for the incoming air to the heat exchanger for the leaving air, and, upon heat exchange with the leaving air, recirculated in a separate duct to the heat exchanger for the incoming air. A heat buffer for storing the heated liquid is connected on the hot side of one of said ducts, and the ducts are interconnected by a valve controlled cross passage for by-passing the heat exchanger for the leaving air during defrosting thereof.

4 Claims, 2 Drawing Figures

DEVICE FOR THE EXCHANGE OF HEAT BETWEEN SUPPLY AIR AND EXHAUST AIR IN INDOOR PREMISES

BACKGROUND OF THE INVENTION

The present invention relates to a device for the exchange of heat between air flowing into and out of indoor premises, respectively called supply air and exhaust air, which device is composed of two heat exchangers each containing sets of passages that are separate but arranged to permit the mutual exchange of heat, one set of passages carrying a liquid that circulates, via lines, between the two exchangers, while the other set carries the respective air streams. This type of airconditioning exchanger is generally less efficient than the regenerative type, with a rotor to transfer heat between the two air streams as the latter pass through it. One of the advantages of a set-up with separate heat exchanger units is that while the regenerative exchanger requires air ducts for both streams of air to be routed to the exchanger, two separate exchangers can be installed wherever there is room for them in the building, e.g. in the cellar and the loft of a private house. The connecting lines for the circulating liquid can be of considerably smaller cross-section than the air duct of the regenerative exchanger, and are hence easy to route through the house. This is especially true in cases where it is desired to improve the heating economy of an existing building by installing airconditioning exchangers.

In winter there is an especially urgent need to reclaim as much as possible of the heat contained in outgoing air, and the main task of the invention is to ensure defrosting of the exhaust heat exchanger where, because of the loss of heat to the circulating liquid, the exhaust air often reaches a relative humidity of 100% and a temperature low enough to cause moisture to condense and form a deposit of ice on the walls of the air passages.

SUMMARY OF THE INVENTION

According to the present invention, defrosting is effected without appreciably changing the temperature after the supply heat exchanger. The essential features of the invention are: that in the section of piping that conducts the liquid from the exhaust exchanger to the supply exchanger, a vessel is set up to collect a quantity of the liquid that has been heated in the exhaust exchanger; and that a valve element and by-pass line are provided to enable the exhaust exchanger to be bypassed, so that the circulation of warm liquid can be maintained between the vessel and the supply exchanger while the exhaust exchanger is being defrosted by exhaust air.

The heat exchanger units are often installed at different levels, and it is a further object of the invention to keep the liquid pressure in the lower exchanger unit at a low value, this being of advantage for the design and the performance of the exchangers.

DESCRIPTION OF THE DRAWINGS

The invention will be described below in further detail with reference to the examples of embodiments illustrated in the attached drawings, and in the course of the description other features characterizing the invention will be mentioned.

DETAILED DESCRIPTION OF AN EMBODIMENT OF THE INVENTION

Figure 1:
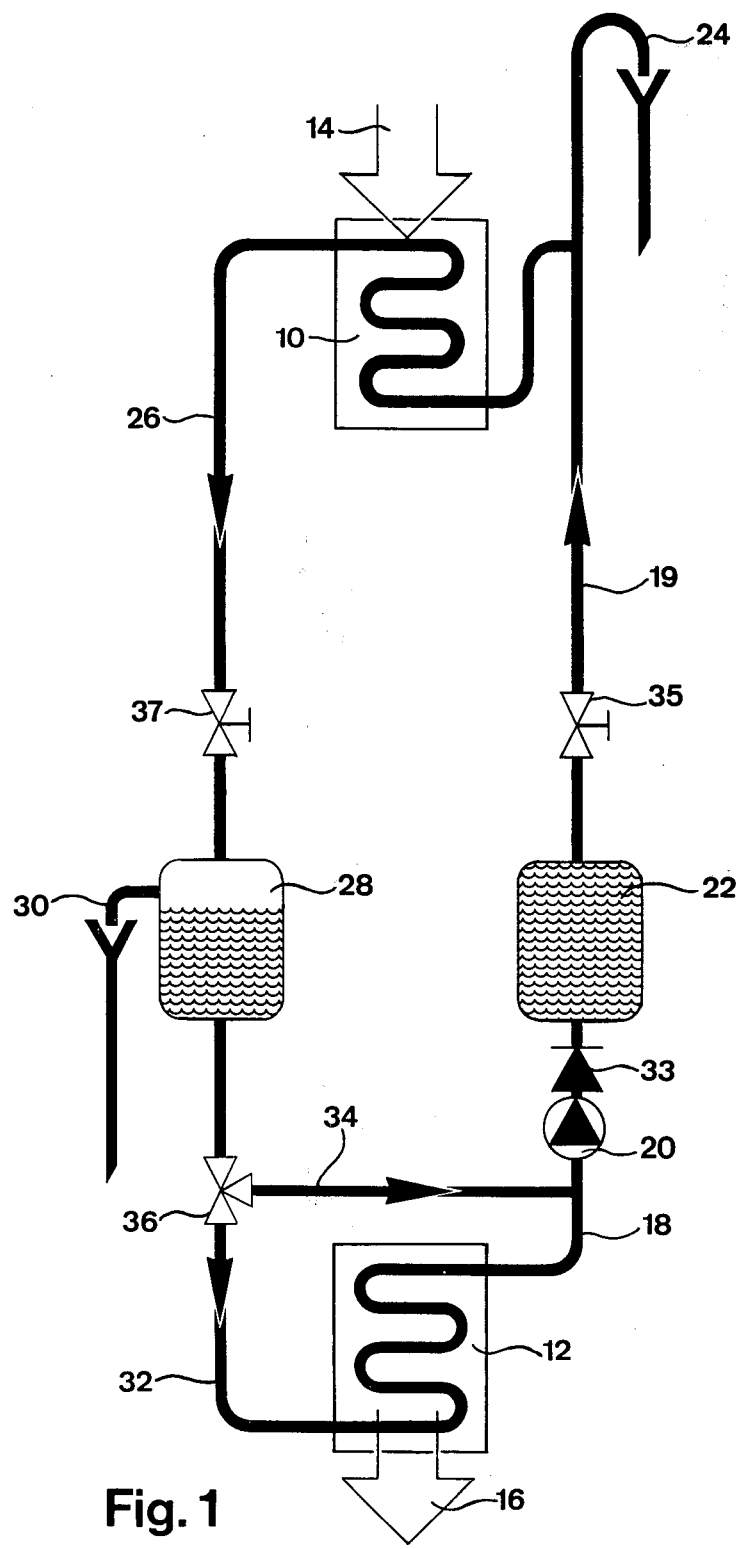
FIGS. 1 and 2 show a diagrammatic side view of two embodiments of the invention. Matching components in the two figures are denoted by the same numbers.
Figure 2:
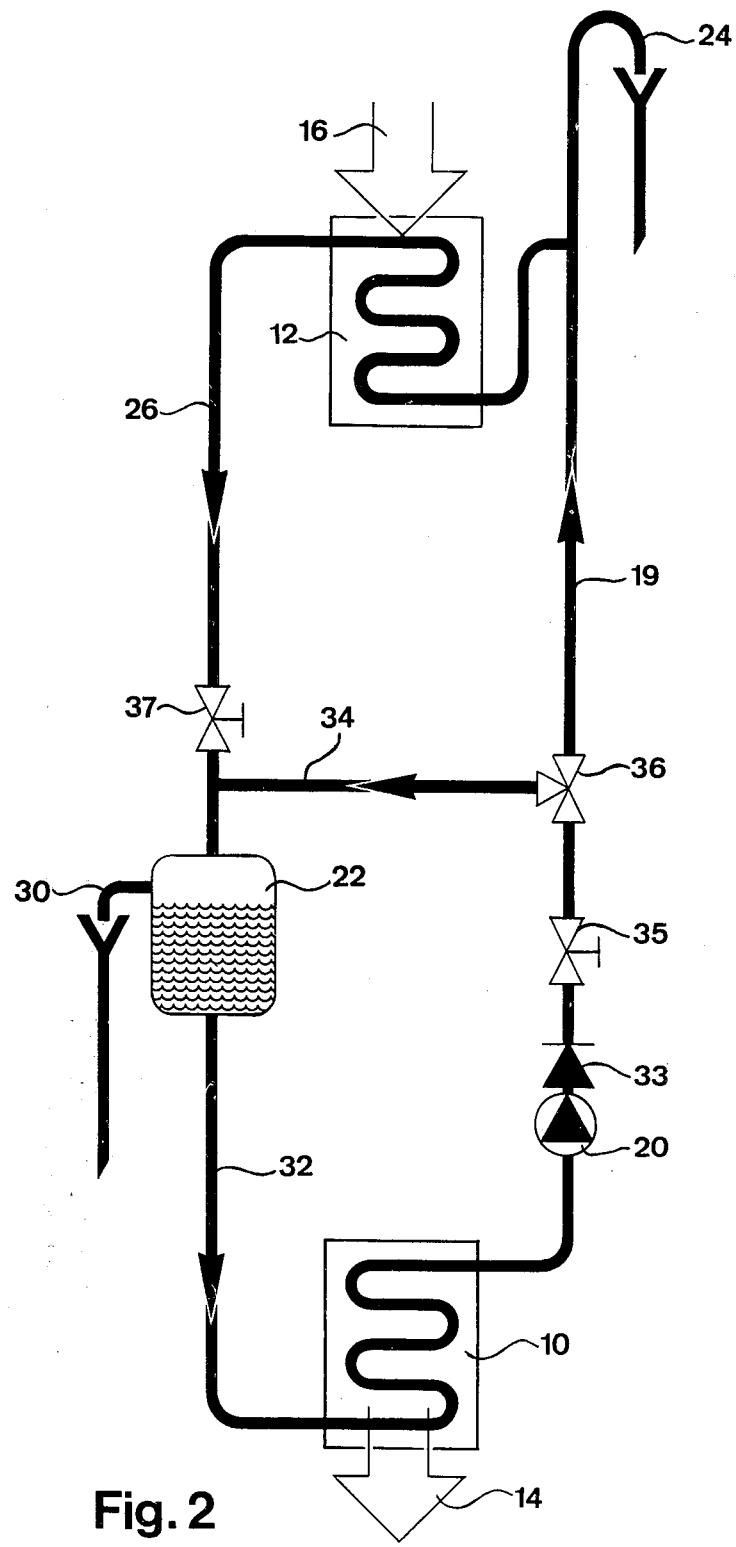

In FIGS. 1 and 2, the numbers 10 and 12 denote the two heat exchangers, which may both be identical construction and designed, for example, in conformity with U.S. Pat. No. 3,256,930. They are divided by means of foils into air passages alternating with passages for the circulating liquid. The interstitial air passages are open along at least two mutually opposite sides, while the interjacent passages for liquid are closed and and connected to a common inlet and outlet. In the figures, the supply air or fresh air is fed as indicated by the arrow 14 to the heat exchanger 10, while the exhaust air, i.e. the used indoor air, leaves the room via heat exchanger 12 as indicated by the arrow 16. The streams of air and of liquid may flow counter-current or cross-current relation to each other.

In the embodiment of FIG. 1 the supply exchanger 10 is located at a higher level in the building than the exhaust exchanger 12. The heated liquid is conducted from the exhaust exchanger 12 to the supply exchanger 10 via ducts 18, 19, in which are installed a pump 20 and a vessel 22 that holds a sufficient volume of liquid to act as a heat buffer, as will be explained in more detail below. The duct 19 may be continued to a level above the heat exchanger 10 to terminate in an overflow pipe 24.

After surrendering its heat to the supply air, the cooled liquid passes on via a line 26 to an expansion vessel 28. The top of the latter communicates with the atmosphere via a pipe 30, which means that the duct 32 connecting the vessel 28 with the lower heat exchanger 12 will hold a head of fluid that is considerably less than that equivalent to the vertical distance between the heat exchangers 10 and 12. A non-return valve 33 may be provided in the duct 18, e.g. between the pump 20 and the vessel 22, to prevent the liquid head from acting throughout the vertical height of the system if the pump should stop. The foils that form the passages for the liquid in the heat exchanger are thus subjected to a low fluid pressure, which simplifies the choice of foil materials and thickness, hence improving the efficiency and reducing the manufacturing cost of the heat exchanger. Between the two circulation ducts, for the liquid, a duct 34 is set up which communicates via a three-way valve 36 to the downward duct 32. The duct 34 is connected to the upward duct 18, 19 below the pump 20.

In normal operation, the valve 36 assumes a position in which the liquid circulates between the two heat exchangers, picking up heat from the exhaust air in exchanger 12 and then giving up this heat to the incoming supply air in exchanger 10. The liquid, having been cooled in the latter step, returns via duct 26, the expansion vessel 28 and line 32 to heat exchanger 12.

If in winter the outside temperature is, say, −20° C. and a temperature of +20° C. is maintained indoors, streams of air at these temperatures will be passing through the respective heat exchangers. Then, if the exchangers are assumed to be 60% efficient and no moisture is given up to the exhaust exchanger, the exhaust air will have a temperature of −4° C. on leaving heat exchanger 12, while the supply air will be heated from −20° C. to +4° C. The liquid in the rising branch 18, including the heat buffer 22, will be at a temperature of +12° C., while the temperature of the liquid in the downward line will be −12° C. It follows that if water is used as the liquid, it must contain an antifreeze agent, such as glycol. The incoming supply air can be heated to a higher temperature, e.g. by means of a heater battery, before being mixed with the air in the rooms.

It is apparent from the foregoing that the temperature on the liquid side of the exhaust exchanger 12 can fall below 0° C. in winter. On the other side, the exhaust air may have a comparatively high absolute humidity, with the result that as it is cooled in the heat exchanger, its dewpoint is reached. As a consequence, moisture will be deposited on the walls of the air passages, and to prevent the latter from icing up the exchanger must be defrosted periodically. This is achieved by cutting off the stream of liquid to the exchanger 12 so that only the relatively warm exhaust air is passing through the exchanger, thus causing the deposit of ice to melt and drain out of the upright passages in the exchanger. According to the invention, this defrosting operation is effected by resetting valve 36 to a position in which a closed circuit is formed via duct 34, by-passing the exhaust exchanger 12.

In this way, a continued circulation of liquid is maintained through the supply exchanger 10 via duct 34, by reason of which the comparatively warm liquid continues to flow from the heat buffer 22 to the supply exchanger 10, and thence via duct 26, the expansion tank 28 and the valve 36 back to duct 34. Thus, the supply air will continue to be heated, so that its temperature on leaving the supply exchanger will not be inconveniently low. For this purpose, the heat buffer 22 is dimensioned to ensure that the accumulated heat is adequate to avoid a detrimental drop in the temperature of the supply air during the time it takes to defrost the other exchanger 12. Then, when the three-way valve 36 is reset to its normal position, the liquid circulation between the two exchangers will resume and thus the liquid will be heated by the exhaust air. Equilibrium is re-established within a short time. The expansion tank 28 may be of considerably smaller volume than the heat buffer 22.

The embodiment of FIG. 2 differs from the foregoing in that the exhaust exchanger 12 is located at the higher level. The heat buffer 22, which may also serve as an expansion tank, is in this case installed in the downward duct 26a carrying the liquid heated in the exhaust exchanger. The heat buffer 22 is under atmospheric pressure and hence is provided with a discharge pipe serving as an overflow 30. The exhaust exchanger 12 is disconnected for defrosting by resetting the three-way valve 36 to divert the circulation over duct 34. While circulation is proceeding by this path, the heat accumulated in the heat buffer 22 is given up in the supply exchanger.

The heat buffer 22 can be dimensioned so that the temperature of the supply air will vary only a few degrees during defrosting.

Cut-off valves 35, 37 can be provided in the riser pipe 19a and the downward pipe 26a respectively, as illustrated in the figures.

The invention is naturally not restricted to the embodiments illustrated, but can be varied in the widest sense within the terms of its underlying concept. The beginning and end of the defrosting cycle may be controlled by a suitable means, e.g. a device for sensing the pressure gradient on the exhaust air side of the exhaust exchanger.

What is claimed is:

1. In a heat exchanger system in which sensible and/or latent heat is exchanged between a stream of incoming air into an enclosure and a stream of air leaving the enclosure, comprising a heat exchanger for the incoming air stream and a heat exchanger for leaving air stream, each of said exchangers comprising a group of passages through which the incoming air stream and the leaving air stream, respectively, are passed in heat exchange relationship with a liquid pumped through a separate group of passages, said liquid being circulated in a closed circuit comprising a first duct (26, 26a) leading from the heat exchanger for the incoming air to the heat exchanger for the leaving air, and a second duct (19, 19a) leading from the heat exchanger for the leaving air to the heat exchanger for the incoming air, the improvement for defrosting the heat exchanger for the leaving air, comprising:
    (a) a valve-controlled cross duct interconnecting said first and second ducts for by-passing the heat exchanger for the leaving air; and
    (b) a heat buffer connected in series with said second duct for storing an undivided portion of the heated liquid from the heat exchanger for the leaving air and communicating with said cross duct during the defrosting operation.

2. A heat exchange system according to claim 1, in which said heat exchangers are located at different elevations and said first and second ducts extend between said heat exchangers in said circuit, one of said first and second ducts including an expansion vessel to create a liquid column beneath the expansion vessel having a lower head than the column above the expansion vessel.

3. A heat exchange system according to claims 1 or 2, in which the heat buffer comprises an expansion chamber.

4. A heat exchange system according to claim 3, in which said combined heat buffer and expansion vessel are located in said downwardly extending duct.

* * * * *